(12) United States Patent
Jean

(10) Patent No.: US 12,574,412 B2
(45) Date of Patent: Mar. 10, 2026

(54) METHOD AND SYSTEM FOR PROCESSING AUTHENTICATION REQUESTS

(71) Applicant: 9287-2621 Québec inc., Terrebonne (CA)

(72) Inventor: Jerry Jean, Terrebonne (CA)

(73) Assignee: 9287-2621 QUÉBEC INC., Terrebonne (CA)

( * ) Notice: Subject to any disclaimer, the term of this patent is extended or adjusted under 35 U.S.C. 154(b) by 480 days.

(21) Appl. No.: 17/389,650

(22) Filed: Jul. 30, 2021

(65) Prior Publication Data

US 2022/0038502 A1     Feb. 3, 2022

Related U.S. Application Data

(60) Provisional application No. 63/058,624, filed on Jul. 30, 2020.

(51) Int. Cl.
H04L 9/40     (2022.01)

(52) U.S. Cl.
CPC .............. H04L 63/20 (2013.01); H04L 63/08 (2013.01)

(58) Field of Classification Search
CPC ..... H04L 63/20; H04L 63/08; H04L 63/0807; H04L 63/0823; H04L 63/18; H04L 63/0853
See application file for complete search history.

(56) References Cited

U.S. PATENT DOCUMENTS 7,100,195 B1     8/2006   Underwood
7,607,164 B2     10/2009  Vasishth et al.

8,015,597 B2     9/2011   Libin et al.
8,045,486 B2 *   10/2011  Swan ...................... H04L 41/12
                                                    709/224
8,341,270 B2     12/2012  Mazzaferri et al.
8,355,407 B2     1/2013   Wookey et al.
8,621,587 B2     12/2013  Halls (Continued)

FOREIGN PATENT DOCUMENTS

EP     3258374 B1    10/2019
GB     2577067 B      3/2020

(Continued)

*Primary Examiner* — Syed A Zaidi
*Assistant Examiner* — Aidan Edward Shaughnessy
(74) *Attorney, Agent, or Firm* — Decode Legal Inc.; Charles-Andre Caron; Irina Kostko

(57)     ABSTRACT

A method for managing an authentication request in a computer network comprising a domain controller. The method comprising the steps of: capturing an authentication request received from a client computer after the authentication request is treated by the domain controller but before any final decision is generated by the domain controller; piling the authentication request in a cache; determining whether the authentication request is a background refresh call or an interactive logon request by inspecting a log of the client computer from which the authentication request has been received; sending a notification to an electronic device associated with a user account indicated in the authentication request; applying a policy to the authentication request based on at least one of the user account identifier and an identification of the client computer; and generating a final decision based on the policy applied to the authentication request.

17 Claims, 9 Drawing Sheets

(56)          References Cited

U.S. PATENT DOCUMENTS

|  |  |  |  |
|---|---|---|---|
| 9,064,124 B1* | 6/2015 | Davis | H04L 67/568 |
| 9,419,968 B1 | 8/2016 | Thakre | |
| 9,674,173 B2 | 6/2017 | Fox | |
| 9,690,924 B2 | 6/2017 | McClure et al. | |
| 10,057,234 B1* | 8/2018 | Murchison | H04L 63/145 |
| 10,169,562 B2* | 1/2019 | Bandyopadhyay | G06F 21/445 |
| 10,367,835 B1* | 7/2019 | Raviv | H04L 63/1425 |
| 10,628,294 B2 | 4/2020 | Datta | |
| 10,666,673 B2 | 5/2020 | Rieke et al. | |
| 10,958,640 B2 | 3/2021 | Divoux et al. | |
| 2002/0095497 A1* | 7/2002 | Satagopan | H04L 63/0884 |
| | | | 709/225 |
| 2015/0222614 A1* | 8/2015 | Johnson | H04L 63/062 |
| | | | 726/7 |
| 2016/0094546 A1* | 3/2016 | Innes | H04L 63/0876 |
| | | | 713/156 |
| 2016/0182488 A1* | 6/2016 | Mowers | H04L 63/08 |
| | | | 726/4 |
| 2017/0061112 A1* | 3/2017 | Bandyopadhyay | |
| | | | H04L 63/0853 |
| 2018/0097789 A1* | 4/2018 | Murthy | H04L 63/0227 |
| 2019/0116196 A1 | 4/2019 | Sancheti et al. | |
| 2019/0273731 A1* | 9/2019 | Kassner | H04L 63/0464 |
| 2019/0311093 A1* | 10/2019 | Moloian | G06F 21/31 |
| 2019/0386979 A1* | 12/2019 | Khylkouskaya | H04L 63/083 |
| 2020/0137097 A1 | 4/2020 | Zimmermann et al. | |
| 2022/0294794 A1* | 9/2022 | Liu | G06N 5/04 |

FOREIGN PATENT DOCUMENTS

|  |  |  |
|---|---|---|
| WO | 2016044359 A1 | 3/2016 |
| WO | 2016176686 A1 | 11/2016 |
| WO | 2018063583 A1 | 4/2018 |

* cited by examiner

100

Figure 1B:
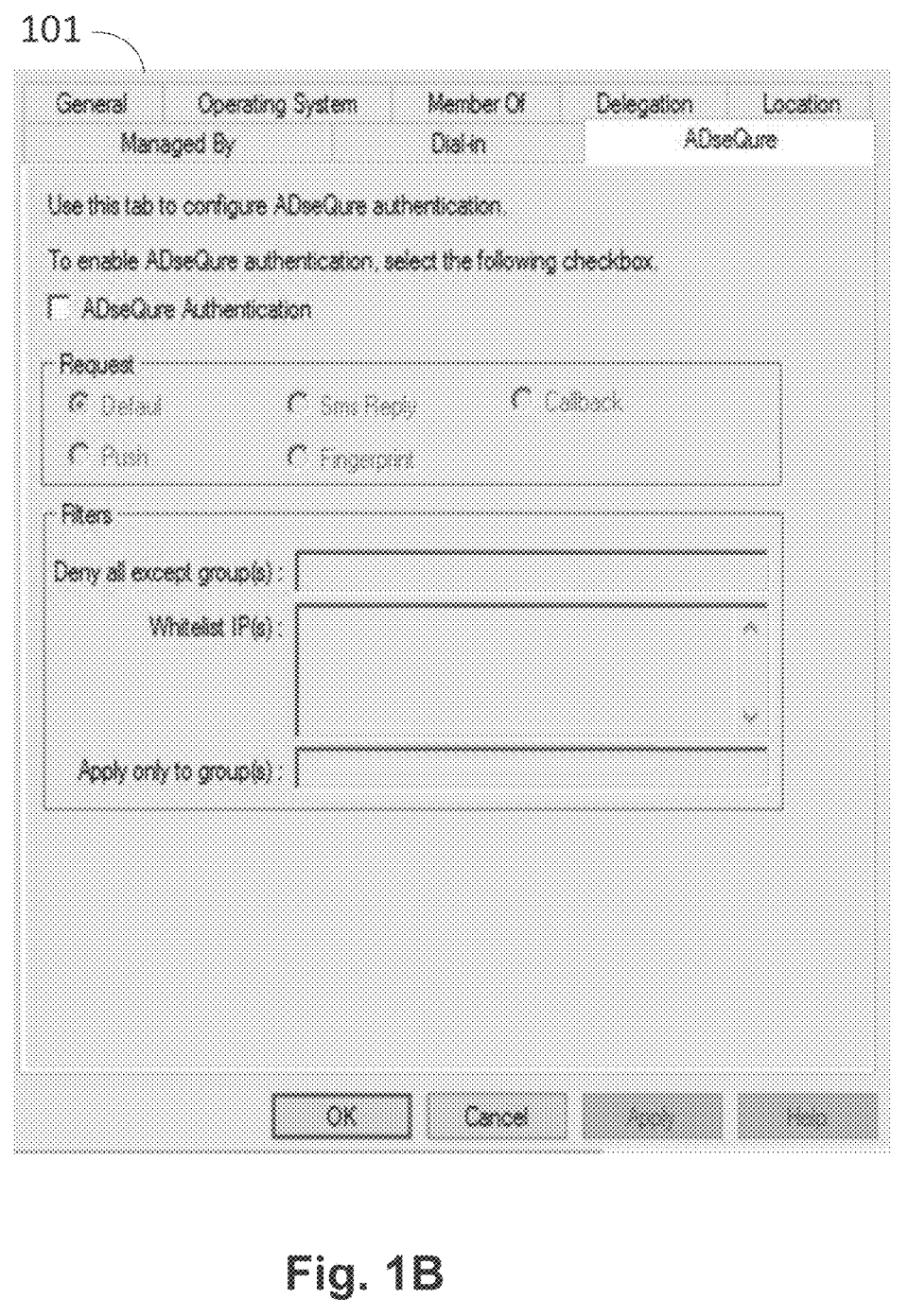

101

General          Operating System          Member Of          Delegation          Location Managed By          Dial-in          ADseQure Use this tab to configure ADseQure authentication.

To enable ADseQure authentication, select the following checkbox.

☐ ADseQure Authentication

Request
○ Default          ○ Sync Reply          ○ Callback
○ Push          ○ Fingerprint Filters Deny all except group(s) :

Whitelist (IPs) :

Apply only to group(s) :

OK          Cancel

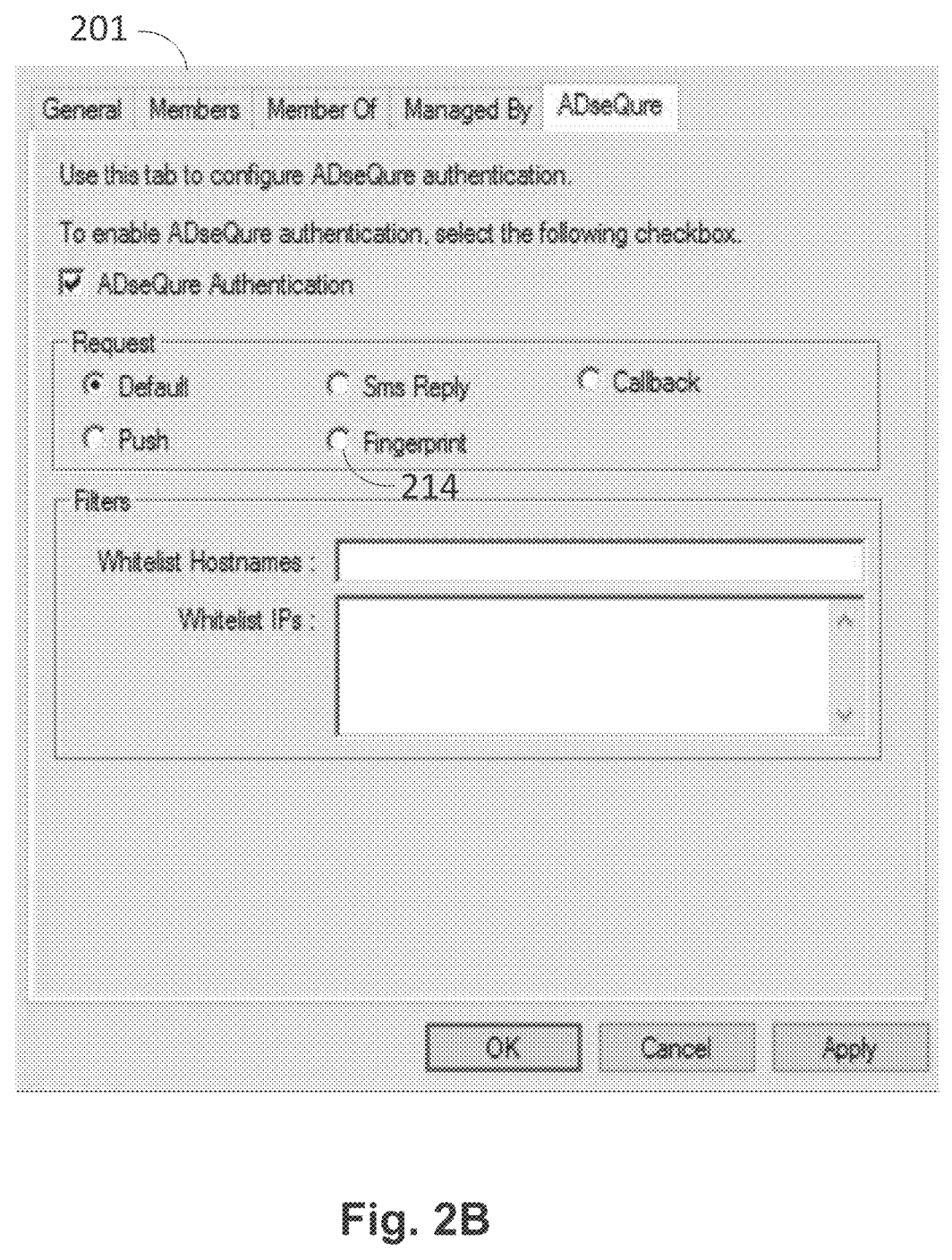

General   Members   Member Of   Managed By   ADseQure

Use this tab to configure ADseQure authentication.

To enable ADseQure authentication, select the following checkbox.

☑ ADseQure Authentication

Request
○ Default          ○ Sms Reply          ○ Callback
○ Push             ○ Fingerprint

214

Filters
Whitelist Hostnames :
Whitelist IPs :

OK          Cancel          Apply

Fig. 2B

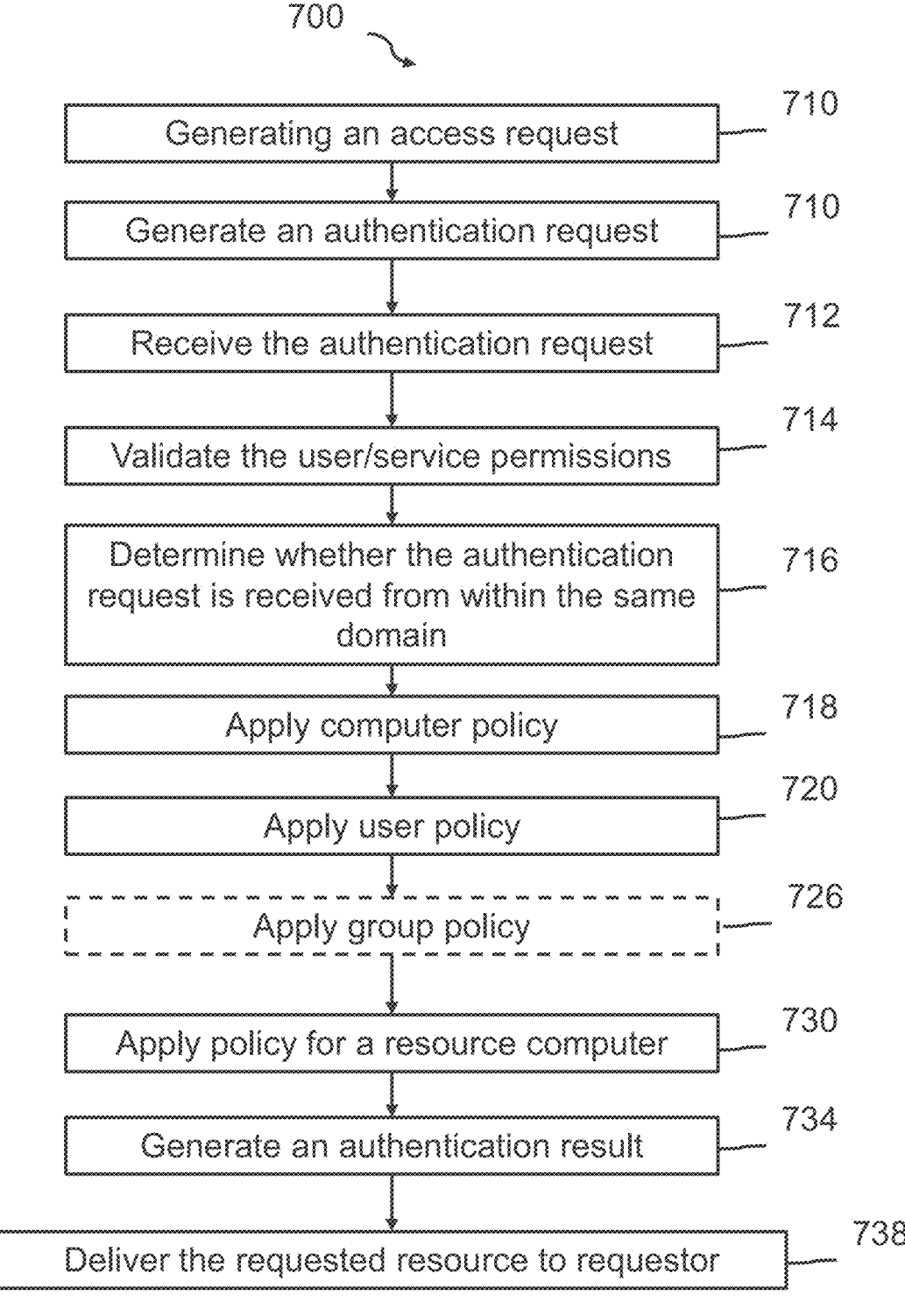

700

| | |
|---|---|
| Generating an access request | 710 |
| Generate an authentication request | 710 |
| Receive the authentication request | 712 |
| Validate the user/service permissions | 714 |
| Determine whether the authentication request is received from within the same domain | 716 |
| Apply computer policy | 718 |
| Apply user policy | 720 |
| Apply group policy | 726 |
| Apply policy for a resource computer | 730 |
| Generate an authentication result | 734 |
| Deliver the requested resource to requestor | 738 |

Fig. 7

METHOD AND SYSTEM FOR PROCESSING AUTHENTICATION REQUESTS

RELATED APPLICATION

The present United States Patent application claims priority to U.S. Patent Application No. 63/058,624, filed Jul. 30, 2020. This document is incorporated herein by reference in its entirety.

FIELD

The subject matter disclosed herein generally relates to authentication in a computer network. More specifically, it relates to methods and systems for processing of authentication requests.

BACKGROUND

There are various ways of managing authentication and controlling access policy in a computer network. For example, a Windows™ domain is a form of a computer network in which all user accounts, computers, printers and other security principals, are registered with a central database located on one or more clusters of central computers known as domain controllers. In such an environment, authentication takes place on domain controllers. Each person or a service which requires access to a resource located within a domain receives a unique user account that may then be used to prove their identity upon access to resources within the domain.

In a Windows™ environment, Active Directory is the Windows™ component in charge of maintaining a central database of the unique user accounts. The Active Directory is configured to execute authentication with a single authentication factor, and is used for the services provided in the domain.

SUMMARY

1. A method for managing an authentication request in a computer network, the computer network comprising a domain controller, the method comprising the steps of:
   capturing an authentication request received from a client computer after the authentication request is treated by the domain controller but before any final decision is generated by the domain controller;
   determining whether the authentication request is a background refresh call or an interactive logon request by inspecting a log of the client computer from which the authentication request has been received;
   in response to determining that the authentication request is an interactive logon request, sending a notification to an electronic device associated with a user account indicated in the authentication request;
   applying a policy to the authentication request based on at least one of the user account identifiers and an identification of the client computer; and
   generating a final decision based on the policy applied to the authentication request.

According to an embodiment, there is a further step of, prior to determining if the authentication request is the background refresh call or the interactive logon request, piling the authentication request in a cache, and, in response to receiving another authentication request, piling the other authentication request in the cache after the authentication request.

According to an embodiment, there is a further step of, prior to capturing the incoming authentication request, receiving a parameter for a notification to a personal electronic device in a control panel of an administrator of the domain controller.

According to an embodiment, the steps are performed by a server hosting the domain controller.

According to an embodiment, applying the policy further comprises applying the policy on a group object.

According to an embodiment, applying the policy further comprises applying a policy on a computer object which is a client.

According to an embodiment, applying the policy further comprises applying a policy on a user object.

According to an embodiment, there is a further step of determining whether the client computer belongs to a domain to which the domain controller belongs, and in response to determining that the client computer belongs to the domain, sending the notification to the electronic device associated with the user account indicated in the authentication request.

According to an embodiment, the computer network comprises a plurality of domain controllers, further comprising designating one of the domain controllers as a master domain controller and every other one of the domain controllers as slave domain controllers, authentication being treated by the master domain controller to avoid redundant treatment by every other one of the domain controllers.

According to another aspect of the present disclosure, there is provided a method for managing an authentication request in a computer network, the computer network comprising a domain controller, the method comprising the steps of:
   capturing an authentication request received from a client computer after the authentication request is treated by the domain controller but before any final decision is generated by the domain controller;
   determining if the authentication request received from a client computer is received from within a domain to which the domain controller belongs, or from outside the domain, by inspecting an IP address in the authentication request;
   if the authentication request received from a client computer is received from within a domain to which the domain controller belongs, determining whether the authentication request is a background refresh call or an interactive logon request by inspecting a log of the client computer from which the authentication request has been received;
   if the authentication request received from a client computer is received from outside the domain to which the domain controller belongs, determining whether the authentication request is a background refresh call by comparing with a register of prior authentication requests and associated IP addresses, and if no, determining that the authentication request is an interactive logon request and registering the IP address.

According to an embodiment, there are further provided the steps of:
   in response to determining that the authentication request is an interactive logon request, sending a notification to an electronic device associated with a user account indicated in the authentication request;
   applying a policy to the authentication request based on at least one of the user account identifiers and an identification of the client computer; and generating a final decision based on the policy applied to the authentication request.

According to an embodiment, there is a further step of, prior to determining if the authentication request is the background refresh call or the interactive logon request, piling the authentication request in a cache, and, in response to receiving another authentication request, piling the other authentication request in the cache after the authentication request.

According to an embodiment, there is a further step of, prior to capturing the incoming authentication request, receiving a parameter for a notification to a personal electronic device in a control panel of an administrator of the domain controller.

According to an embodiment, the steps are performed by a server hosting the domain controller.

According to an embodiment, applying the policy further comprises applying the policy on a group object.

According to an embodiment, applying the policy further comprises applying a policy on a computer object which is a client.

According to an embodiment, applying the policy further comprises applying a policy on a user object.

According to an embodiment, there is a further step of determining whether the client computer belongs to a domain to which the domain controller belongs, and in response to determining that the client computer belongs to the domain, sending the notification to the electronic device associated with the user account indicated in the authentication request.

According to an embodiment, the computer network comprises a plurality of domain controllers, further comprising designating one of the domain controllers as a master domain controller and every other one of the domain controllers as slave domain controllers, authentication being treated by the master domain controller to avoid redundant treatment by every other one of the domain controllers.

BRIEF DESCRIPTION OF THE DRAWINGS

Further features and advantages of the present disclosure will become apparent from the following detailed description, taken in combination with the appended drawings, in which:

FIGS. 1A-1B are screenshots illustrating a control panel or a window comprising a modified graphical user interface including a tab for configuring an additional authentication factor for a user, group or computer, according to an embodiment of the present disclosure;

FIGS. 2A-2B are screenshots illustrating (as an example since we could use other methods to define policies such as GPO or registry keys or through silent mode configuration using installation command parameters) a control panel or window comprising a modified graphical user interface including a tab for configuring rules to require an additional authentication factor for the domain, according to an embodiment of the present disclosure;

FIG. 7 depicts a method for authentication, in accordance with at least one embodiment of the present disclosure.

It will be noted that throughout the appended drawings, like features are identified by like reference numerals.

DETAILED DESCRIPTION

Figure 1A:
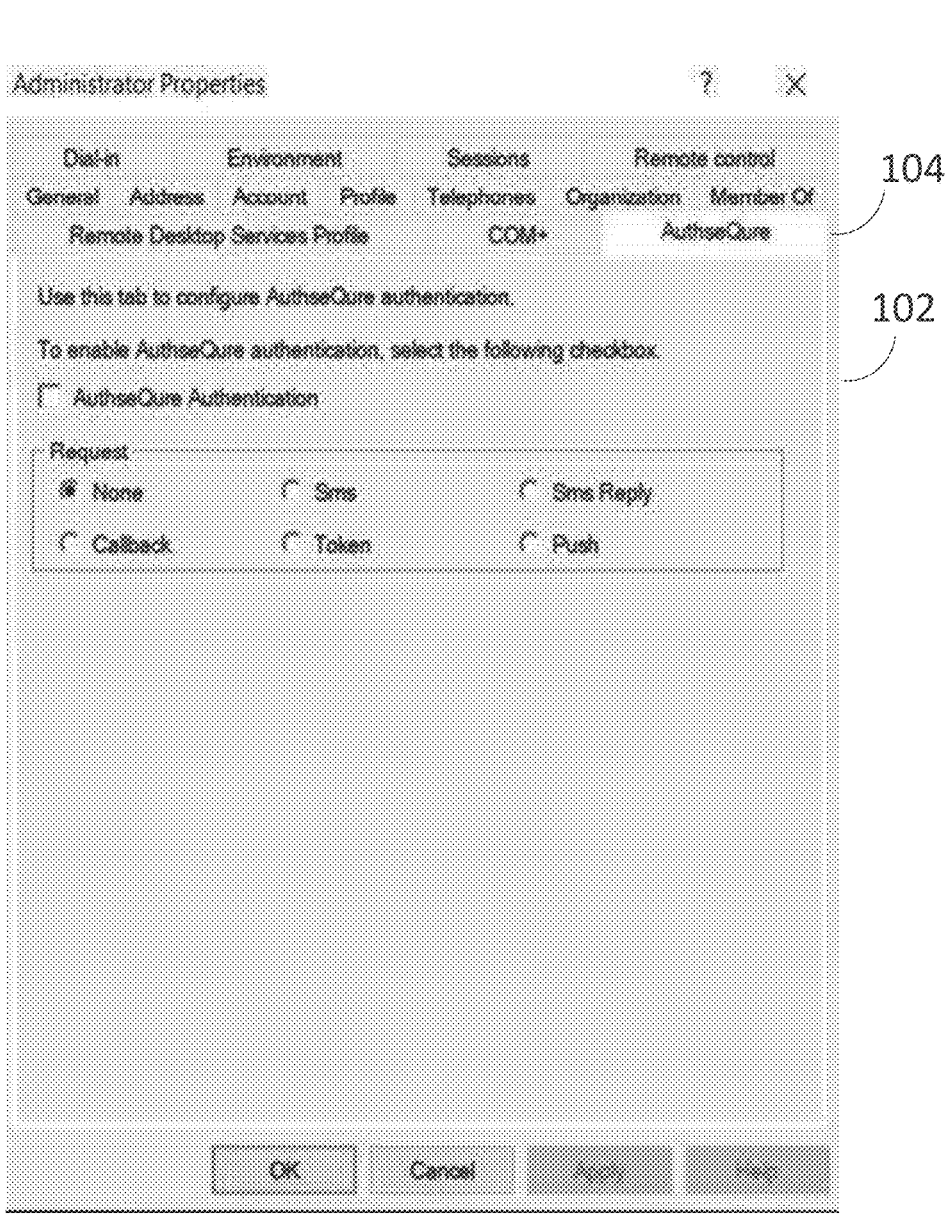

According to an embodiment, the method described herein involves execution of an additional set of instructions on a server. These instructions, according to an embodiment of the present disclosure, manage authentication in a computer network and alter the way a domain controller operates on a server, in order to manage a validation, also commonly referred to as "authentication", of requests made in the computer network in an unconventional way. These instructions are added to a conventional domain controller in order to modify the conventional domain controller of a computer network to obtain a domain controller as described herein (making it a modified domain controller according to an embodiment of the present disclosure). The domain controller as described herein (i.e., as modified by the instructions) manages authentication in a non-default, unconventional mode. These instructions, according to an embodiment of the present disclosure, can also be added to a plurality of otherwise conventional domain controllers within a network, while designating a single one of them as a master domain controller and the others as slave domain controllers, to have the second authentication as described below managed by a single modified domain controller instead of a plurality of domain controllers.

According to an embodiment, a graphical user interface of the domain controller for the administrator user of the domain controller is modified to include a tab which adds a possibility of defining security rules in the decision process evaluation of the authentication of the user. As an example, one of the options in the security rules comprises requiring an additional authentication factor. The additional authentication factor may be used in addition to the default authentication for various objects/requestors such as users, groups of users or computers. Requests received at/by the domain controller are captured and treated in a manner different to a default manner to account for the of the additional security rules such as, without limitation, a second authentication factor, as described further below.

According to an embodiment, program code instructions are installed in the memory of the server. The program code instructions add an additional layer of authentication in the domain controller itself without using any additional server for the evaluation for requirements for additional verifications such as the second factor authentication. The same equipment on which the conventional domain controller is executed is used to execute the domain controller as modified by the instructions according to the present disclosure.

According to an embodiment, the set of instructions is a sub-authentication routine, which may be implemented as an executable file, such as a Dynamic-link library (DLL) file, which is associated to the domain controller, is installed to the domain controller and added as a reference to the operating system (OS) registry to be called automatically.

The instructions executed by the sub-authentication routine act as an intermediary for requests made to the domain controller. In order to be added and be usable later, the sub-authentication routine can first be provided as an installer, such as an MSI file in the case of a Microsoft environment.

Upon installation, the sub-authentication routine acts as an intermediary between the conventional domain controller and the server implementing the external process for additional verification (e.g., another server implementing an additional layer of authentication). The server hosting the domain controller is the one on which the program (i.e., the set of instructions which modify the conventional domain controller) is run to determine if the additional layer of authentication is required, based on different inputs. It receives and treats requests after the request is received by the Domain controller and applies the logic defined in the rules before the response of success and failure is treated by the domain controller in its default operation mode. Said rules also include options to determine complex use cases such as filtering decision for strict application of the policy or for bypass scenarios.

In a second factor authentication scenario, the program adds a possibility of requiring a second authentication factor in addition to the default authentication factor (typically a password in association to a user account). This possibility is embodied by the addition of a tab in a window of the graphical user interface of the domain controller for the administrator user of the domain controller, as shown in FIGS. 1A-2B.

FIG. 1A is a screenshot of a control panel 102 of a graphical user interface for the administrator (commonly referred to as "admin user") of the domain controller, showing the actions that can be taken upon a given user in the network with respect to the required authentication for that user in particular. There is shown a non-default tab 104 exemplarily named "ADseQure". This tab 104, not found in the default implementation of any domain controller, is added by the installation and operation of the sub-authentication routine which implements the method described herein.

Figure 2A:
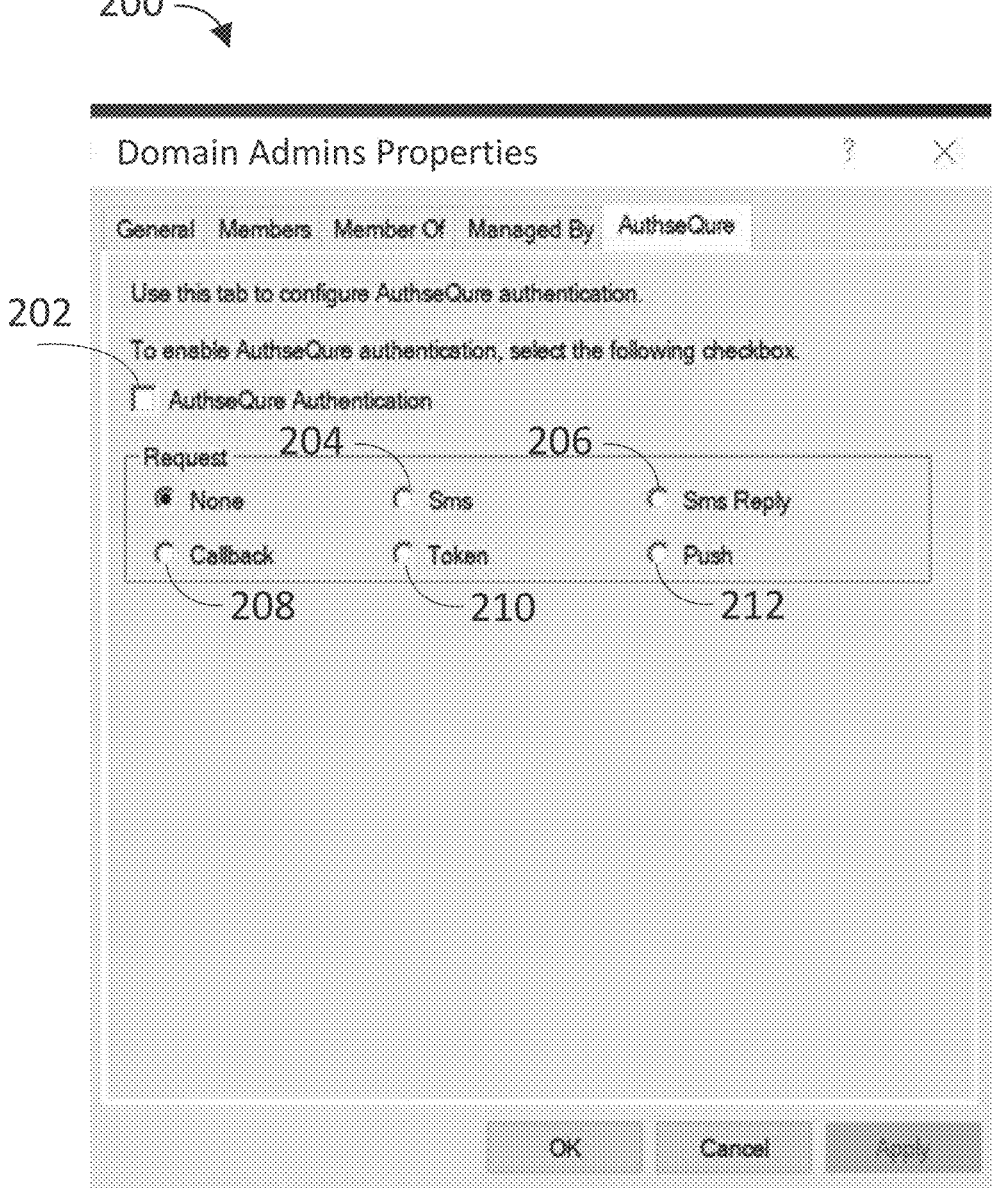

FIG. 2A illustrates a screenshot 200 of a similar situation, applied to the whole domain instead of only to a user, group or computer.

It shows that a checkbox 202 can be checked to implement a second authentication factor. The manner by which this second authentication factor is requested can be set in this panel by selecting the appropriate option, such as an SMS notification 204, an SMS notification requiring a reply by the receiving user 206, a phone call (callback) 208, a token on the computer 210, or a push notification 212.

FIGS. 1B and 2B depict screen shots 101, 201 showing additional options, such as using a fingerprint 214 which can be natively used for authentication on personal devices such as smartphones.

Figure 5:
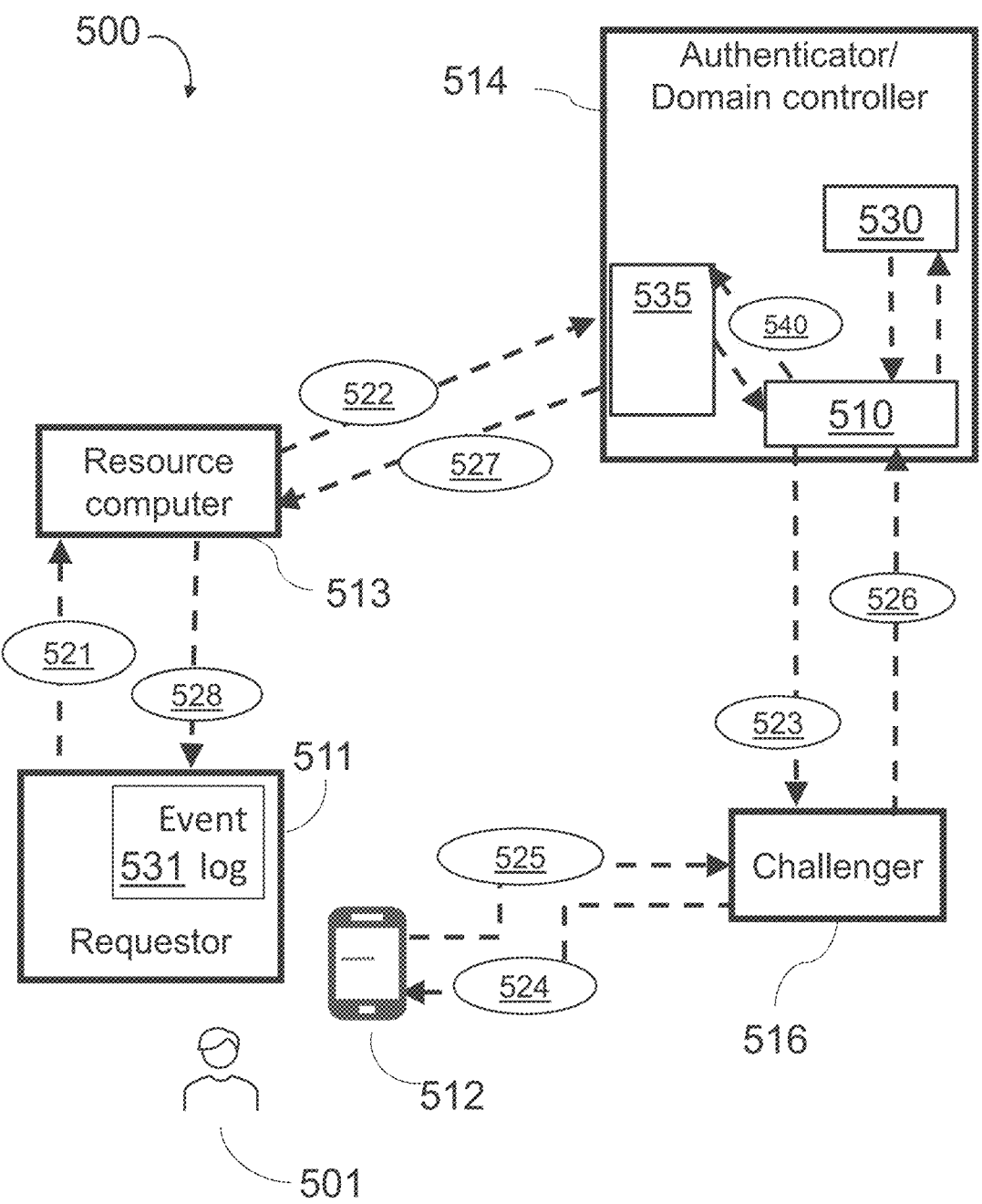
FIG. 5 is a schematic diagram illustrating the computing environment used to manage an authentication request to the domain controller, according to an embodiment of the present disclosure.

According to a preferred embodiment, the second authentication factor is tied to a particular device (i.e., a personal electronic device of a user having physicality) such as, for example, a personal electronic device 512 of FIG. 5, which is unambiguously associated with the user. The personal electronic device 512 may be, for example, as a smartphone or a cell phone, which the right user is expected to have with them physically. For example, calling a phone number directs the communication to the person owning the device, directly and without interference. Should the phone be stolen, the theft would be reported, and the phone number would be attributed to the new cell phone of the real user who had their phone stolen. Therefore, the cell phone or smartphone is an additional layer of security which is very safe and having the second authentication factor tied to such a personal device adds the level of security of the logging process and of the use of services over the computer network.

Advantageously, the creation of rules that includes requirements for second authentication factor and evaluation of their applicability when a request is made are centralized within the operation of the domain controller itself. The domain controller uses a server or a plurality of computers to be operated, and requires the use of a database to store user credentials. This hardware needs to be provided, maintained and repaired when needed. The method according to the present disclosure includes instructions which are called when the domain controller is requested to perform operations and which modify the overall result, but in comparison with the conventional domain controller, requires no additional server and no additional database to create and perform rule evaluation for additional requirements (i.e., additional in comparison with the conventional domain controller). The entity providing the sub-authentication routine for installation to operate the method does not need to receive user credentials for the second authentication factor. The only entity required to store or deal with such additional credentials is the entity which manages authentication in the first place, advantageously avoiding duplication of user credentials storage and management.

In other words, the sub-authentication routine for installation to operate the method integrates with conventional routines existing in the domain controller for managing "native" authentication for Kerberos or NTLM protocols, i.e., the sub-authentication routine integrates with the existing domain controller to perform additional tasks using the hardware on which the domain controller is conventionally executed and no more hardware. This is shown in FIGS. 4-5

Figure 4:
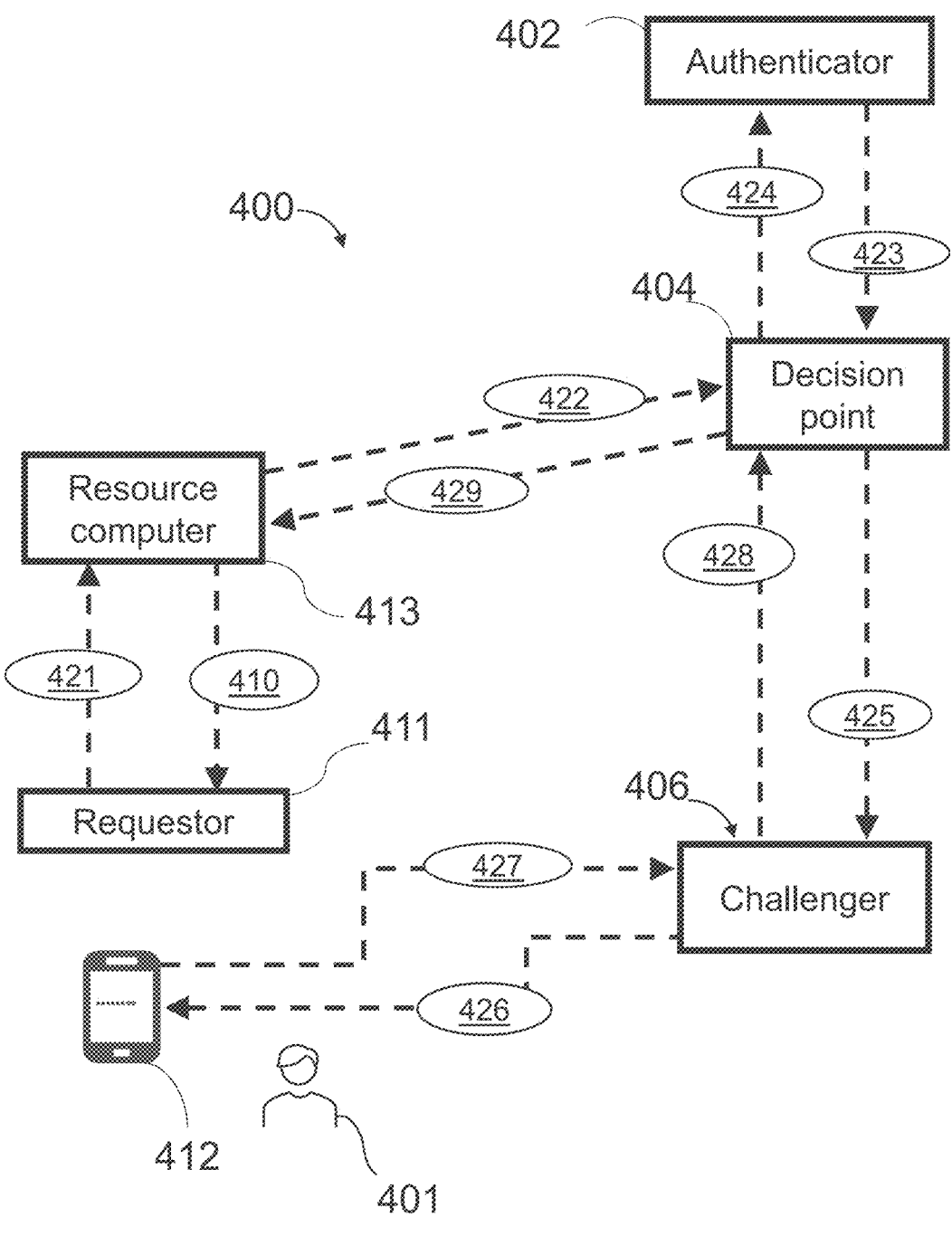
FIG. 4 is a schematic diagram illustrating the computers used to manage a request to the domain controller, according to the prior art.

FIG. 4 shows a prior art system 400 which operates according to the prior art. A user 401 operates a computer device 411 (also referred to herein as a "requestor 411"). The user 401 also has a personal electronic device 412 as described above (in general, not the same as the computer device 411). To access resources on a resource computer (or a resource server) 413, the requestor 411 sends a resource request 421 to the resource server 413. The resource server 413 sends an authentication request 422 to a decision point 404. The decision point 404 then transmits an additional authentication request 424 to an additional authenticator server 402. Such additional authenticator server 402 is one of additional servers. The additional authenticator server 402 acts as a policy decision point in addition to the decision point 404 which gives access to resources in the resource server 413. Another additional server referred to herein as a challenger 406 may be used to trigger the additional authentication factor. The challenger requires additional protocols such as remote authentication dial-in user service (RADIUS) or hypertext transfer protocol (HTTP).

In FIG. 5, there is shown a system 500 in accordance with at least one embodiment of the present disclosure. The system 500 does not have the additional servers. The server executing the domain controller and the authenticator 514 is the one which is modified by installation of the sub-authentication routine as described herein. The sub-authentication routine comprises instructions which, when executed by the processor, perform steps of a method for managing an authentication request as described herein.

When executing the instructions of the sub-authentication routine, the modified domain controller 514 captures incoming requests 522 as an intermediary, determines whether an additional authentication factor is necessary, and applies and forwards (when the additional authentication factor is necessary) the request to the domain controller or authenticator 514 afterward for default treatment.

As shown in FIG. 5, the architecture also makes possible the use of an application programming interface (API) or call the RADIUS protocol to act as a challenger 516. Capturing and caching requests is an advantageous way to circumvent typical restrictions (as discussed further below) and may enable the implementation of the method in the domain controller 514 itself, and therefore on the same server.

While the sub-authentication routine 510 is installed for integration of the method for managing an authentication request as described herein into the domain controller 514, there is no application as such, and no other computer is required to analyze the logic. The sub-authentication routine 510 is installed along with the domain controller to modify what would otherwise be a conventional domain controller. The sub-authentication routine 510 is installed for acting as an integrated intermediate for the domain controller 514, in particular for the Active Directory, for example.

This centralized control performed by the modified domain controller 514 is much more robust and secure than the control described in the prior art system 400. The robustness and additional security in system 500 is achieved due to the second authentication factor configuration and rules tied to an electronic device 512 that is dealt with at the level of the domain controller 514. The domain controller 514 modified according to an embodiment of the present disclosure is centralized, thereby controlling and giving access to computer services in the resource computer 513 through the computer network in a centralized manner reducing the number of computer and server resources and with minimal disturbance for the user 501, and giving simple and coherent security parameter control to the administrator.

The method described herein is implemented not by the underlying conventional domain controller (e.g., Active Directory) itself, but rather by the sub-authentication routine which is installed and executed, typically on the same server as the domain controller (thereby modifying the overall operation and result), such that at run time, the sub-authentication routine receives incoming authentication requests first, as an intermediary, and performs decisions on such requests before forwarding them to the domain controller (e.g., Active Directory). As described below, there are different types of authentication requests of which this intermediary is agnostic and which would require a differentiated treatment.

Authentication requests 522 to the domain controller 514 may be of two types: interactive mode and background mode. Such two types of the authentication requests 522 may be treated differently by the domain controller 514 when executing the method of the present disclosure.

Authentication requests 522 may be made in an "interactive mode", that is involving user interaction, and an express authentication request may be made. For example, authentication requests 522 may be made when a user logs on their computer (for example, the requestor 511 in FIG. 5) and enters their credentials.

On the other hand, a user's computer may be transmitting, in a "background mode", background refresh calls which request to refresh the authentication. Such refresh calls are transmitted to the authentication modules in the domain controller 514. These refresh calls are not user-initiated and are made in the background by the computer system and are automated, typically after an approximately predetermined period of time (typically about 90 minutes). These periodical refresh calls are made to verify access rights to services and resources 513 in the domain on a given computer or for a given user 501 when the user's computer (requestor 511 in FIG. 5) is in use or idle.

When the requestor 511 transmits the refresh calls, it may be undesirable that the refresh calls automatically trigger an execution of the authentication with a second authentication factor, for example sending a SMS to the user, requiring a response, on a periodic basis within a single work session. Therefore, while the method as described herein comprises the execution of the instructions (sub-authentication routine 510) installed on the domain controller 514, it should further identify to which of the two modes belongs the request that is being made.

In at least one embodiment, a sub-authentication routine 510, which is installed in the domain controller 514 (to modify it) in addition to the conventional routines of the domain controller 514, determines whether an authentication request is of the interactive type (i.e. transmitted in the first or interactive mode) or of a background type (transmitted in the second or background mode).

In at least one embodiment, to determine whether the authentication request belongs to the interactive or the background mode, the domain controller, as modified with the set of instructions according to an embodiment of the present disclosure, inspects an event log of the operating system of the requestor 511 from which the authentication request 521 originates, as long as this requestor 511 belongs to the same domain as the resource computer 513 in the computer network.

In at least one other embodiment, to determine whether the authentication request 521 or 522 belongs to the inter-active or the background mode, the domain controller may inspect the authentication request 521 or 522 and retrieve a request type value to identify whether the authentication request 521 or 522 is interactive (i.e. transmitted from the requestor 511 in the interactive mode) or is provided in the background (i.e. transmitted from the requestor 511 in the background mode).

When the authentication request 522 is received by the domain controller 514, if a domain-controller policy applies to the authentication request 521 or 522, the authentication request 522 is captured and cached before being treated. In at least one embodiment, at run time, the sub-authentication routine which implements the method as described herein inspects an event log 531 of the operating system of the requestor 511—the client computer through which the user account made the authentication request 521.

If an indication of the authentication request 521 is present in the event log 511, the domain controller 510 determines that the authentication request 521 is the background refresh call transmitted in the background and no second authentication factor is triggered. If an indication of the authentication request 521 is absent in the event log 511, the authentication request 521 is considered to be an interactive request. Such interactive logon request triggers the requirement of the second authentication factor using the manner selected through the graphical user interface (GUI) 100 of the admin user for that specific user account, group, and/or client computer.

In response to determining that the authentication request 521 or 522 is the interactive logon request (also may be referred to as an "interactive logon"), the authentication request 522 is processed by the domain controller 510 with the second authentication factor. In response to determining that the authentication request 521 or 522 is the background refresh call, the authentication request 522 is processed by the domain controller 510 without the second authentication factor.

Figure 3:
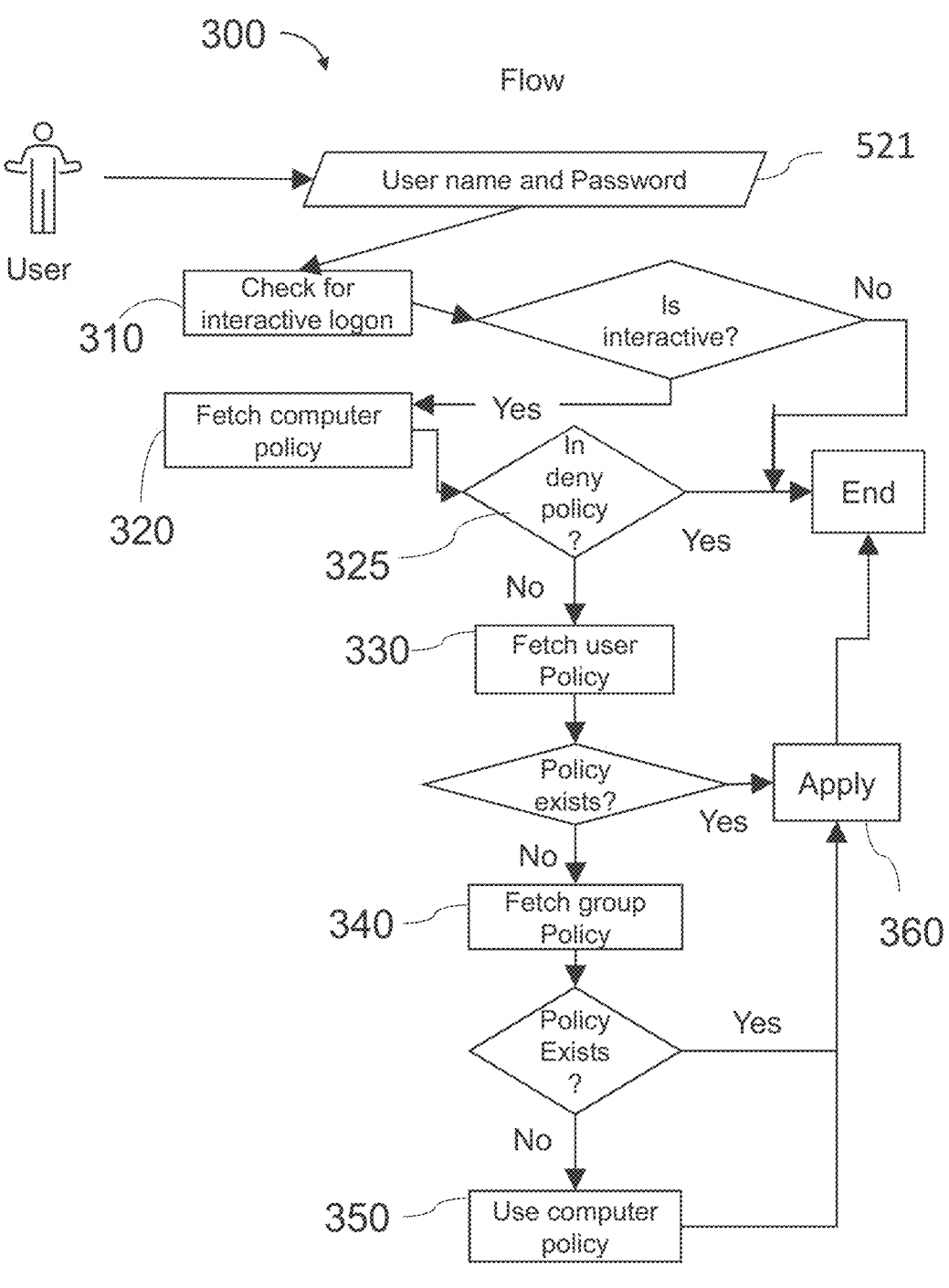
FIG. 3 is a flowchart illustrating decisions generated to determine whether an additional authentication factor is required before forwarding the request to the domain controller, according to an embodiment of the present disclosure.

FIG. 3 depicts a flowchart 300 with steps of the method for managing an authentication request, in accordance with at least one embodiment. Referring also to FIG. 5, the authentication request 521 comprises a call or request to the domain controller 514 from a client computer, a requestor 511, in the computer network. The requestor 511 may be from the same domain or from another domain.

The authentication request 521 comprises a combination of a user account identifier (such as a user name) and a password, which is the first authentication factor. In a prior art system 400, the first authentication factor is the only one within the operation of the domain controller. The instructions executed by the sub-authentication routine 510 in the modified domain controller 514 permit, at run time, to capture the incoming authentication requests 521 or 522 and to determine whether an additional authentication with an additional authentication factor needs to be implemented. As described above, in response to determining that the additional authentication needs to be performed, additional authentication operations are performed by the domain controller 514.

Referring now to both FIG. 3 and FIG. 5, at step 310, domain controller 514 determines whether the incoming authentication request 521 or 522 is an interactive request, which requires an additional authentication factor, or a background refresh call, which does not require any additional authentication factor, in which case the request is returned with a success message to the domain controller for default treatment.

At step 320, for an interactive logon, there is determined an identity of the resource computer 513 and the requestor computer 511. For example, the internet protocol (IP) address in the network may be determined.

At step 325, there is determined by the domain controller whether a blocking restriction for access is assigned to that resource computer 513 and the requestor computer 511, in which case access is denied.

If there is no blocking restriction for access is assigned, at step 330, user policy is applied to the user account from which the request originates, unless there is no specific user policy. In response to determining that there is no specific user policy (in other words, in response to the absence of the specific user policy), at step 340, a group policy is applied, unless there is no specific group policy. If there is no specific group policy, at step 350, a computer policy is applied. The policy can be applied to the corresponding objects ("object" as understood in computer terminology), i.e., to the user object, to the group object or to the computer object which corresponds to the client computer.

At step 360, the application of the policy which may be, for example, the application of a second authentication factor comprises any of the interactive notification or requests made to the personal device 512 (such as, for example, a cell phone, a smartphone) of the user 501. Referring also to FIG. 1 and FIG. 2, such second authentication factor has been determined prior to receiving the authentication request 100, and the second authentication factor has been determined by the admin user on their parameter panel 102 of the Active Directory configuration panel 100 for a person/group/computer (FIG. 1) or for the whole domain (FIG. 2).

For example, as mentioned above, the second authentication factor may comprise sending a SMS (text message) to a predetermined phone number associated to the user (for example, an SMS which notifies the user of a login attempt and requiring a written confirmation), and receiving a response ("OK" or "YES", for example), thereby implementing the second authentication factor tied with the personal device 512 of the user 501. For example, the domain controller 514 may send a second factor request to a challenger 516. After a successful authentication by the challenger 516, the authentication request 522 is released from the cache associated to the domain controller 514 and forwarded to the domain controller 514 (Active Directory) for usual treatment (the cache is described below).

It will be appreciated that the second authentication factor request 524 may take some time to be successfully processed by the personal device 512 and treated by the user 501 in order to generate the second authentication factor 525. A delay of treatment of the second authentication factor request 524 may have consequences on the operation of the domain controller 514, as explained immediately below. In order to reduce the delay of treatment of the second authentication factor request 524 by the personal device 512 and the user 501, intermediate (i.e., the sub-authentication routine executing the method) capturing the incoming second authentication factor requests 524 and piling the second authentication factor requests 524 in a cache for later execution.

Indeed, when a method as described herein is implemented in a domain controller 514 of a computer network, some of the authentication requests 522 made through the domain controller 514 may be summarily denied because authentication has failed.

The reason for the failure of authentication has been found to originate from a time limit for authentication which is set in the domain controller 514, and which is predetermined and non-modifiable. For example, in Windows Active Directory, authentication may need to succeed within a time limit which may be of approximately 5 seconds. When the second authentication factor (such as the SMS response requirement) is introduced into the workflow of the domain controller 514 according to the present disclosure, a delay is introduced which goes beyond the time limit set in the conventional domain controller 514 (for example, a delay of about 60 seconds). Authentication may therefore fail for being too long to verify in the domain controller as modified according to an embodiment of the present disclosure, and the authentication request 522 made to the domain controller 514 is denied altogether.

It was found that such a server problem arising from the implementation of the method described above would benefit from an additional step which would prevent such authentication failures and request denials. The additional step comprises piling the authentication requests 522 in a temporary storage cache (also referred to herein as a "cache 530") to ensure that all authentication requests 522 are transmitted to the domain controller 514 after completion of the two-factor authentication transaction. This caching includes caching of background refresh calls made without any user interaction in an automated manner, e.g., all authentication requests 522 involving the domain controller 514 are captured, using the instructions that modify the domain controller, prior to their treatment by the convention unmodified part of the domain controller to avoid them being refused altogether only because they happen to be timed in proximity to a user-initiated request that requires a second authentication factor.

Therefore, when a request is received at the domain controller 514, the origin of the authentication request 522 is identified, i.e., the user 501 and the user's computer—requestor 511—are identified. If the origin of the authentication request 522 (including background automated requests) is the same origin as an interactive logon request (i.e., originating from a user action) for which a two-factor authentication is being processed, the authentication request 522 is appended at the end of a pile in the cache. If the authentication request 522 is an interactive logon request for which two-factor authentication is required, it is cached in a temporary storage cache 530, implemented along with the sub-authentication routine 510 in the domain controller 514, until completion of the two-factor authentication and subsequent authentication requests 522 received from the same origin are cached in that pile in the cache 530 for as long as the two-factor authentication transaction is not completed. The cache 530 is located in the domain controller 514. The pile in the cache 530 is configured to control the queue of authentication requests received by the domain controller 514 repetitively or simultaneously during the execution of the transaction by the domain controller 514. Without the pile, a positive response would be returned to the requestor without waiting for the result of the second factor authentication. The pile in the cache 530 may be shared with other domain controllers so that the other controllers obtain information that a transaction is being executed by one of the domain controllers, and these other domain controllers need to wait till the end of the execution and the response generated by the domain controller 514.

When the two-factor authentication transaction is completed, the authentication requests 522 are then treated sequentially in the pile in the cache 530 of cached authentication requests. In that case, all authentication credentials are applied automatically to all cached requests having the same origin.

FIG. 7 depicts a method 700 for authentication, in accordance with at least one embodiment of the present disclosure.

Referring to FIG. 5 and FIG. 7, at step 710, a requestor 511 of the user 501 attempts to access a resource computer 513 in the computer network, and an access request 521 originates from the requestor 511 (computer attempting to access resources on the resource computer 513). The requestor generates the access request 521. The requestor 511 may be operated with a user account to which a personal electronic device 512 is associated.

At step 712, the domain controller 514, which may be also referred to as an authenticator, receives the authentication request 522 from the resource computer 513. Such the authentication request 522 is generated in response to the access request 521 received by the resource computer 513 from the requestor 511. The resource computer 513 and the requestor 511 are both client computers to the domain controller 514. At step 714, the domain controller 514 validates the user/service permissions.

After successful validation of the user permissions, the domain controller 514 passes the authentication request 522 to the validation application. The validation application may be located in the domain controller 514. At step 716, the validation application verifies whether the authentication request 522 is received from a trusted source, that is, a trusted computer in the computer network.

If the authentication request 522 comes from a trusted computer, then the validation application sends a call to a remote origin system through the form of a Windows management instrumentation (WMI) query to detect whether the authentication request 522 is an interactive logon request. If the authentication request 522 is the interactive logon request, the modified domain controller 514 proceeds to the next step. If the authentication request 522 is a background background refresh calls, the validation application ignores the authentication request 522 and return a positive response to the domain controller 514 authentication processor. If the authentication request 522 was not received from a trusted source, then no WMI request is send and the validation application assumes that the authentication request 522 was generated in the interactive mode and the authentication request 522 is an interactive logon request.

At step 718, rule evaluations begin and computer-based policies of the resource computer 513 to which the user 501 is requesting access such as a remote desktop protocol (RDP) are first priorities in the sequence of treatment.

If an identification of the requestor 511 is indicated in a deny policy as a computer to which the access should be denied, the requestor 511 is denied access to the resource computer 513. The requestor 511, and therefore, the user 501, may be denied access if the requestor 511 is a member of a computer group that is identified on the deny policy. If the user name of the user 501 or the identification of the requestor 511 are not indicated in the deny policy, the request for authentication 522 is passed to the user policy. The policy can be applied on corresponding objects (user object, group object, computer object).

At step 720, the rule evaluates the user policy. If a user policy exists, the executable application 510 applies the logic and validates the filters. If the filters define the second authentication factor corresponding to the user 501 (and the corresponding username), then the executable application 510 sends, in a second factor request 524, the username and other attributes, such as, for example, a user mobile number retrieved from its location which was defined in the initial configuration setup parameters (with reference to FIGS. 1A and 2A).

At step 726, if no user or computer policy is applied, then the group policy is evaluated for a second factor. A request is sent to RADIUS or an appropriate application programming interface (API) and the user 501 is challenged by the external challenger 516 with the second authentication factor. The executable application 510 sends to the external challenger 516 the challenge request 523. The challenge request 523 may comprise, for example, the username and other attributes such as the user mobile number retrieved from its location which was defined in the initial configuration setup parameters (with reference to FIGS. 1A and 2A).

At step 730, the rule evaluations will check for computer-based policies of the resource computer 513 where the requestor 511 requests access to, such as the RDP. Such verification of the computer-based policies of the resource computer 513 has the lowest priority in the sequence of verifications, since no denies was identified at step 718. If a policy exists, the domain controller 514 applies the logic and validates the filters. If the filters comprise an indication that the two-factor authentication apply to the username of the user 501, then the service sends in the challenge request 523, the username and other attributes such as the user mobile number retrieved from its location which was defined in the initial configuration setup parameters.

At step 734, once the policy evaluation and the challenge are performed by the authentication routine 510, the authentication routine 510 generates the authentication result 540 which is returned to the domain controller's 514 point of entry 535. The domain controller 514 then performs conventional authentication and may reject or accept the authentication request 522 based on the authentication result 540 and therefore generate a final decision 527 such as an approval or a disapproval, which can take the form of a security token.

At step 738, the requested resource 528 is delivered to the client computer requestor 511.

The process of calling the API or RADIUS to challenge the user takes a certain amount of time. Therefore, the requestor 511 may keep sending access requests 521 on a regular basis at a regular time interval, and therefore the resource computer 513 may keep sending the authentication requests 522 on a regular basis at a regular time interval. As described herein, the authentication routine 510 in the domain controller 514 caches these authentication requests 522 based on the username and the requestor's 511 internet protocol (IP) address as an index. The authentication routine 510 then applies the authentication result 540 obtained based on the challenge response to all subsequent authentication requests 522 received.

It should be noted that the rules implemented in the authentication routine 510 use filters to treat different business logics called "use cases", where the policy should only apply to a restricted group of objects or bypassed for a restricted group of objects.

Figure 6:
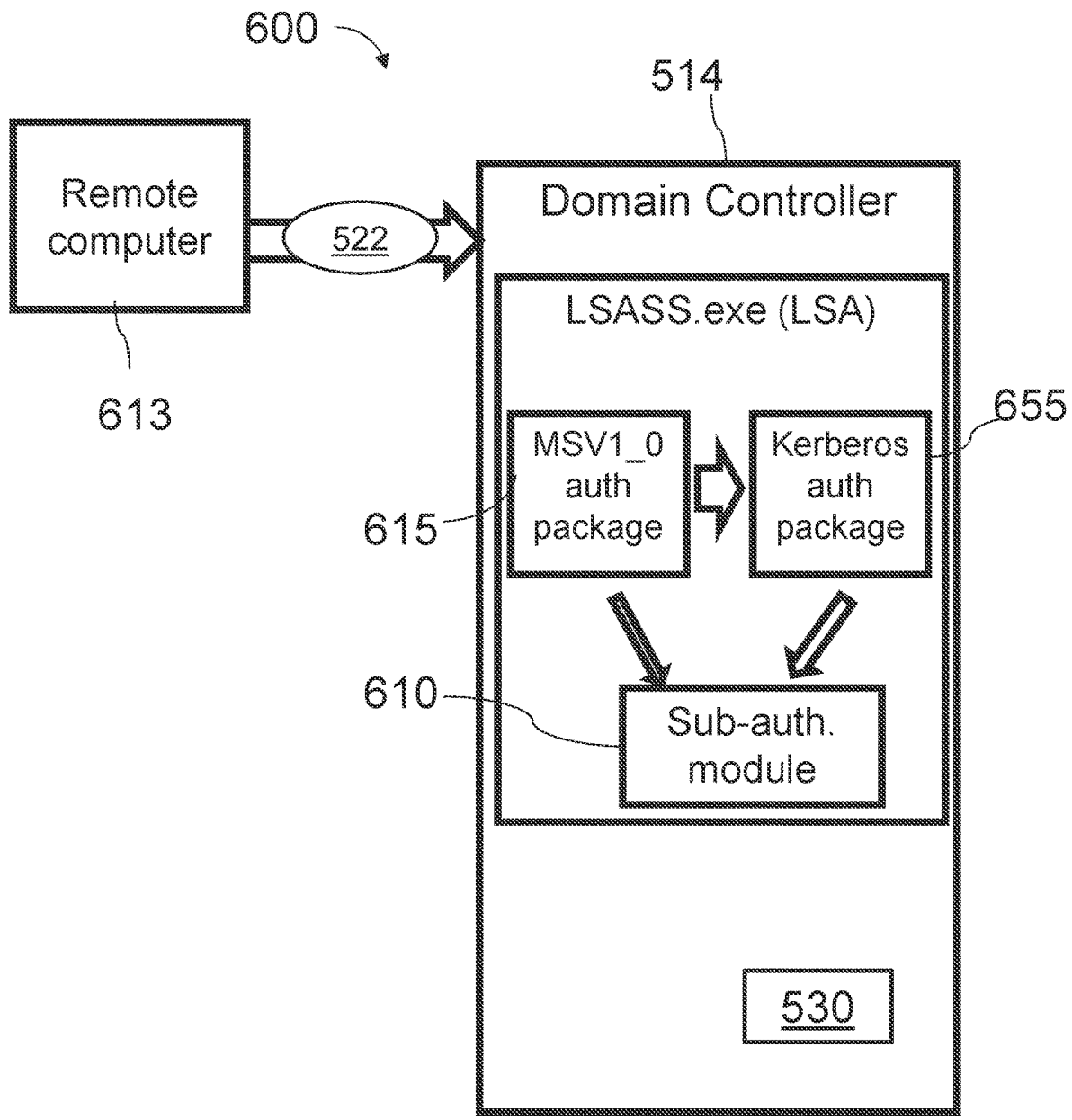
FIG. 6 is a schematic diagram illustrating the modules being called when an authentication request is received by the domain controller from a local computer, according to an embodiment of the present disclosure.

According to an embodiment, and referring to FIG. 6, there is shown an example of a hierarchy 600 of the modules which are called when the authentication request 522 is received by the domain controller 514 from a remote computer 613 (which may be, for example, a resource computer 513 or directly a requestor 511 depicted in FIG. 5). A "subauth" or sub-authentication module 610 (Msv1_0Subauthenticationfilter) corresponds to the sub-authentication routine 510 and is a DLL file which is used to intercept and treat authentication requests 522 at the domain controller 514.

This sub-authentication module 610 enables a local authentication mode when authentication requests 522 are received from non-Microsoft native servers, such as virtual private network (VPN) servers or web servers, or other UNIX-based servers. Enabling a local authentication mode may be useful in the context of remote access operations.

In some embodiments, the authentication requests 522 to the domain controller 514 originate from outside of the domain to which the domain controller 514 belongs (in other words, not from any Microsoft trusted machine within the domain to which the domain controller 514 belongs). The inspection of a log of the remote computer 613 may not possible in order to distinguish between the interactive logon request and the background refresh calls.

The sub-authentication module 610 filters incoming authentication requests 522 to determine if they originate from outside of the domain to which the domain controller 514 belongs. If the authentication request 522 originates from the outside of the domain of the domain controller 514, an IP address is extracted from a header of the authentication request 522 and is used for such identification, and no attempt to read the log will be made, contrarily to the case where the request would be from within the domain to which the domain controller 514 belongs.

An ordered list of calls made when the authentication request 522 is made, depending on two different cases: remote computer 613 located in the domain, or the remote computer 613 being external to the domain. A Kerberos protocol may be used for domain requests and a new technology local area network manager (NTLM) protocol may be used for requests from outside the domain.

Domain computer: Kerberos protocol. Calling sequence: user→computer→AD→MSV1→subauth→dll.

External computer, i.e., untrusted computer: NTLM protocol. Calling sequence: user→untrusted system→AD→MSV1→dll.

In the case of an external computer, the MSV1 dll module needs to be integrated with the Active Directory server. The authentication request 522 received from a remote computer 613 located outside of the domain may be managed by the MSV1 module 615 (NTLM protocol) only, and does not reach the sub-authentication module 610. Instead, the authentication request 522 from the remote computer 613 located outside of the domain is verified using the Kerberos protocol 655.

In at least one embodiment, the sub-authentication module 610 is used only for the authentication requests 522 received from within the domain to which the domain controller 514 belongs. The method ensures that the "generic" MSV1 actively ignores the requests which are from within the domain (i.e., Kerberos protocol) (i.e., such requests are not treated by the Kerberos protocol) and immediately calls the sub-authentication module 610 for their management. Otherwise, they would have been managed twice.

According to an embodiment of the method described herein, one of the procedures used to identify the type of the requests was found that from outside of the domain (NTLM protocol) the requests are modified to mimic the request as if it was originating from the Active Directory server, i.e., its own server hostname, instead of the real remote computer, where the external computer performing request is seen personifying the server. By having the method perform this alteration to the request, the server may deal with the request more simply by avoiding dealing with the signature of outside computers which complicates authentication. However, the original IP address of the computer from which the request originates is still kept.

Therefore, the IP address in the metadata of the request is compared with the IP address of the server (host) to determine whether the request comes from outside the domain, thereby distinguishing requests from within the domain and from outside. The authentication request 522 is then attributed to a "Computer" object which is created from within the Active Directory and which comprises the IP address of interest to register the origin of such an authentication request 522 from outside the domain for future calls and for comparison with the registered IP address of prior requests as registered to determine if the type of authentication is interactive (first attempt) or background (following attempts). According to another embodiment of the method of identification of the type of the authentication request 522, the attribute may be identified from the request itself that could contain the remote computer name or an attribute specifying whether it belongs to the domain or not.

Therefore, when the sub-authentication routine 510 is installed for operating the method, there are integrations made into the MSV1 NTLM module and in the sub-authentication Kerberos module, and an Object is created within the Active Directory server to comprise the IP address of the external system making requests from the outside of the domain.

Now referring to another issue which can be addressed according to an embodiment of the present disclosure, it was also observed that in some cases, multiple requests to the domain controller were received for the same authentication interactive requests. Particularly, this can be observed in an environment in which more than one (or at least two)

domain controllers are present. The method according to an embodiment of the present disclosure involves a process where one domain controller is identified or designated as a master and the other domain controllers are identified or designated as slaves, ensuring only one server would handle the authentication requests. If this was not performed, then a user would involve X requests, where X is the number of domain controllers in the environment, for each access. There is therefore deployed a local API service with the set of instructions as described above installed on all the domain controllers of the domain (wherein there are at least two of them), such that upon receiving an authentication request, the request would trigger a call upon the domain controller designated as the master domain controller through that service and confirm that request is handled and wait for the response. Then the response is shared with all domain controllers, returning the same result to all independent requests to that single client.

The server on which the domain controller 514 is hosted, along with all necessary hardware such as a processor and memory, is of course essential for performing the method. Also essential are the client computers, such as requestors 511 and resource computers 513, used to generate authentication requests, and the communication network (i.e., internet) infrastructure through which the requests are made.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for managing an authentication request in a computer network, the computer network comprising a plurality of domain controllers comprising a domain controller configured to use Kerberos protocol, the method comprising the steps of:

capturing, at the domain controller, an authentication request received from a client computer after the authentication request is treated by the domain controller but before any final decision is generated by the domain controller;

determining, by a sub-authentication routine installed in the domain controller, whether the authentication request is a background refresh call or an interactive logon request by inspecting a log of the client computer from which the authentication request has been received;

in response to determining by the sub-authentication routine installed in the domain controller that the authentication request is an interactive logon request, sending a notification to an electronic device associated with a user account indicated in the authentication request;

applying a policy at the domain controller to the authentication request based on at least one of the user account identifiers and an identification of the client computer; and generating, at the domain controller, a final decision based on the policy applied to the authentication request, wherein prior to determining if the authentication request is the background refresh call or the interactive logon request, piling the authentication request in a pile in a cache located in the domain controller, the background refresh call being automated and the interactive logon request involving user interaction, in response to receiving another authentication request, piling the other authentication request in the pile in the cache after the authentication request for later execution, and sharing the pile with other domain controllers of the plurality of the domain controllers.

2. The method of claim 1, further comprising, prior to capturing the incoming authentication request, receiving a parameter for a notification to a personal electronic device in a control panel of an administrator of the domain controller.

3. The method of claim 1, wherein the steps are performed by a server hosting the domain controller.

4. The method of claim 1, wherein applying the policy further comprises applying the policy on a group object.

5. The method of claim 1, wherein applying the policy further comprises applying a policy on a computer object which is a client.

6. The method of claim 1, wherein applying the policy further comprises applying a policy on a user object.

7. The method of claim 1, further comprising:

determining whether the client computer belongs to a domain to which the domain controller belongs, and, in response to determining that the client computer belongs to the domain, sending the notification to the electronic device associated with the user account indicated in the authentication request.

8. The method of claim 1, further comprising designating one of the domain controllers as a master domain controller and every other one of the domain controllers as slave domain controllers, authentication being treated by the master domain controller to avoid redundant treatment by every other one of the domain controllers.

9. A method for managing an authentication request in a computer network, the computer network comprising a plurality of domain controllers comprising a domain controller configured to use Kerberos protocol, the method comprising the steps of:

capturing, at the domain controller, an authentication request received from a client computer after the authentication request is treated by the domain controller but before any final decision is generated by the domain controller;

determining, by a sub-authentication routine installed in the domain controller, if the authentication request received from a client computer is received from within a domain to which the domain controller belongs, or from outside the domain, by inspecting an IP address in the authentication request;

if the authentication request received from a client computer is received from within a domain to which the domain controller belongs, determining, by the sub-authentication routine installed in the domain controller, whether the authentication request is a background refresh call or an interactive logon request by inspecting a log of the client computer from which the authentication request has been received;

if the authentication request received from a client computer is received from outside the domain to which the domain controller belongs, determining, by the sub-authentication routine installed in the domain controller, whether the authentication request is a background refresh call by comparing with a register of prior authentication requests and associated IP addresses, and if no, determining, at the domain controller, that the authentication request is an interactive logon request and registering the IP address, wherein prior to determining if the authentication request is the background refresh call or the interactive logon request, piling the authentication request in a pile in a cache located in the domain controller, the background refresh call being automated and the interactive logon request involving user interaction, in response to receiving another authentication request, piling the other authentication request in the pile in the cache after the authentication request for later execution, and sharing the pile with the other domain controllers of the plurality of the domain controllers.

10. The method of claim 9, further comprising the steps of:

in response to determining that the authentication request is an interactive logon request, sending a notification to an electronic device associated with a user account indicated in the authentication request;

applying a policy to the authentication request based on at least one of the user account identifiers and an identification of the client computer; and generating a final decision based on the policy applied to the authentication request.

11. The method of claim 9, further comprising, prior to capturing the incoming authentication request, receiving a parameter for a notification to a personal electronic device in a control panel of an administrator of the domain controller.

12. The method of claim 9, wherein the steps are performed by a server hosting the domain controller.

13. The method of claim 10, wherein applying the policy further comprises applying the policy on a group object.

14. The method of claim 10, wherein applying the policy further comprises applying a policy on a computer object which is a client.

15. The method of claim 10, wherein applying the policy further comprises applying a policy on a user object.

16. The method of claim 10, further comprising:

determining whether the client computer belongs to a domain to which the domain controller belongs, and, in response to determining that the client computer belongs to the domain, sending the notification to the electronic device associated with the user account indicated in the authentication request.

17. The method of claim 9, further comprising designating one of the domain controllers as a master domain controller and every other one of the domain controllers as slave domain controllers, authentication being treated by the master domain controller to avoid redundant treatment by every other one of the domain controllers.

\* \* \* \* \*